(12) United States Patent
Deutsch

(10) Patent No.: US 11,093,695 B2
(45) Date of Patent: Aug. 17, 2021

(54) SYSTEMS AND METHODS FOR PROVIDING WRITING ASSISTANCE

(71) Applicant: EMAIL WHISPERER INC., Cream Ridge, NJ (US)

(72) Inventor: Christopher E. Deutsch, Commack, NY (US)

(73) Assignee: EMAIL WHISPERER INC., Cream Ridge, NJ (US)

( * ) Notice: Subject to any disclaimer, the term of this patent is extended or adjusted under 35 U.S.C. 154(b) by 0 days.

(21) Appl. No.: 16/163,691

(22) Filed: Oct. 18, 2018

(65) Prior Publication Data

US 2019/0114312 A1    Apr. 18, 2019

Related U.S. Application Data

(60) Provisional application No. 62/574,064, filed on Oct. 18, 2017.

(51) Int. Cl.
| G06F 40/166 | (2020.01) |
| G06F 40/253 | (2020.01) |
| G06F 40/232 | (2020.01) |
| G06F 3/0482 | (2013.01) |
| G06F 40/30 | (2020.01) |
| H04L 12/58 | (2006.01) |

(52) U.S. Cl.
CPC ......... *G06F 40/166* (2020.01); *G06F 3/0482* (2013.01); *G06F 40/232* (2020.01); *G06F 40/253* (2020.01); *G06F 40/30* (2020.01); *H04L 51/046* (2013.01)

(58) Field of Classification Search
CPC ............................. G06F 17/27; G06F 17/274
See application file for complete search history.

(56) References Cited

U.S. PATENT DOCUMENTS

| 5,920,838 | A | 7/1999 | Mostow et al. |
| 6,201,948 | B1 | 3/2001 | Cook et al. |
| 7,219,301 | B2 * | 5/2007 | Barrie ............... G06Q 50/00 434/322 |
| 7,703,000 | B2 * | 4/2010 | Barrie ............... G06F 16/958 715/230 |

(Continued)

FOREIGN PATENT DOCUMENTS

WO    03079312 A2    9/2003

*Primary Examiner* — Scott T Baderman
*Assistant Examiner* — Benjamin Smith
(74) *Attorney, Agent, or Firm* — Carter, DeLuca & Farrell LLP

(57) ABSTRACT

A system for providing assistance with electronic communications includes a network device configured to communicate with a client computing device, a processor, and a memory including instructions stored thereon. When the instructions are executed by the processors, the instructions cause the system to receive category information and tonal information of an electronic message and a certification level selected from a plurality of certification levels, from the client computing device via the network device, create a project for the electronic message, select an assistant from a plurality of assistants for the project based on the category information and the tonal information, and provide a message, which has been edited by the selected assistant based on the category information and the tonal information, to the client computing device.

21 Claims, 37 Drawing Sheets

(56) References Cited

U.S. PATENT DOCUMENTS

| | | |
|---|---|---|
| 7,890,585 B2 | 2/2011 | Lowe |
| 8,131,559 B2* | 3/2012 | Robinson ............... G06Q 30/00 705/1.1 |
| 8,615,778 B1* | 12/2013 | Evans .............. H04N 21/25891 725/119 |
| 8,954,317 B1 | 2/2015 | Fisher et al. |
| 9,002,700 B2 | 4/2015 | Hoover et al. |
| 9,298,697 B2 | 3/2016 | Allen et al. |
| 9,465,793 B2 | 10/2016 | Hoover et al. |
| 9,563,604 B1 | 2/2017 | Lai et al. |
| 10,521,498 B2* | 12/2019 | Pereira Filho et al. ..................... G06F 21/6209 |
| 2003/0164849 A1* | 9/2003 | Barrie .................... G06Q 50/00 715/733 |
| 2005/0028087 A1* | 2/2005 | Barrie ................... G06F 16/958 715/234 |
| 2010/0057605 A1* | 3/2010 | Robinson ........... G06Q 30/0282 705/37 |
| 2010/0100465 A1 | 4/2010 | Cooke et al. |
| 2011/0313757 A1* | 12/2011 | Hoover ................. G06F 17/274 704/9 |
| 2013/0177894 A1* | 7/2013 | Fotenos .................. G09B 7/00 434/353 |
| 2014/0109136 A1* | 4/2014 | Evans .............. H04N 21/25891 725/34 |
| 2015/0279221 A1* | 10/2015 | Barber ..................... G09B 5/00 434/353 |
| 2015/0370769 A1* | 12/2015 | Pereira Filho et al. ..................... G06F 21/6209 726/28 |
| 2016/0308799 A1 | 10/2016 | Schubert et al. |
| 2017/0220360 A1* | 8/2017 | Chiba .................... G06F 17/24 |
| 2018/0032526 A1* | 2/2018 | Cudak .................. H04L 63/123 |
| 2018/0067912 A1* | 3/2018 | DeLuca .................. G06F 17/24 |
| 2020/0342509 A1* | 10/2020 | Gasore .............. G06Q 30/0185 |

* cited by examiner

| | | |
|---|---|---|
| Welcome!<br>Our Story<br>Take a tour<br><br>Sign In<br>User Name<br>Password<br>ID Number<br><br>I agree to Terms and Conditions<br>I Agree to Liab Waiver<br><br>Lost:<br>User Name<br>Password<br>ID Number<br><br>Subscribe<br>1st Time User | Introduction<br><br>Two reasons to use this website<br>1<br>2<br><br>| Good Email | Bad Email |<br>\|---\|---\|<br>\| Good Email \| Bad Email \|<br><br>Two reasons to use this website<br>1<br>2<br><br>| About us | Term and conditions | Liability Waiver | Forms | Privacy Notice | | | |

FIG. 7

| Description of Keys below and why we need them to assist in email | | | |
|---|---|---|---|
| Business | | Personal | |
| Law | | Medical | |
| Finance/Banking | | Sports | |
| Retail | | Entertainment | |
| Real Estate | | Romance | |
| Construction | | Marriage | |
| Agriculture/Farm | | Divorce | |
| Restaurant | | Personal Finance | |
| | | Home | |
| | | Car | |

Explain Scale from 1-10

| Happy | | Important | |
|---|---|---|---|
| Angry | | Difficulty | |
| Sad | | Detail | |
| Excited | | Vocabulary | |
| Afraid | | | |
| Concern | | | |

See tutorial for explanation of terms

Time to wait for live EWS 10:00 Min

Please connect me to a live Email Whisperer Specialist

Please process my email as soon as you can and send back to me via email

FIG. 8

| Customer View |
|---|
| This is where the whisper happens |
| It is always a good idea to sart an email with respectful/friendly salutation |

| Salutation<br>Hi<br>Hey<br>Dear | | Time to wait for live EWS 10:00 Min |
|---|---|---|
| Customer / User ID# | | |
| | | |
| Email Whisperer ID # | | |
| | | |
| | Please revise further | |
| Accept and Purchase | Add Certification Stamp | Submit for Delayed Editing |
| | Cancel Email and Purchase | |

FIG. 9

| Email Whisperer Specialist View | |
|---|---|
| This is where the whisper happens<br>It is always a good idea to start an email with respectful/friendly salutation | |

| Salutation<br>Hi<br>Hey<br>Dear | Time to wait for live EWS 10:00 Min | |
|---|---|---|
| Customer / User ID# | | Submit to Client |
| | | Email to Client |
| | | Submit for 2nd revision |
| | | Submit to Bin / Poll |
| | | Submit to Management |
| Email Whisperer Specialist (EWS) ID # | | Cancel Email |
| | | Stop Email Send to Management |
| | | Certification Stamp |
| Email Whisperer Manager (EWM) ID # | | |

FIG. 10

| Email Whisperer management View | | |
|---|---|---|
| This is where the whisper happens<br>It is always a good idea to start an email with respectful/friendly salutation | | Cust ID # |
| Salutation<br>Hi<br>Hey<br>Dear | Time to wait for live EWS<br>10:00 Min | EWS ID # |
| Customer / User ID# | | Submit to Client |
| | | Email to Client |
| | | Submit for 2nd revision |
| | | Submit to Poll |
| | | Submit to Management |
| | | Cancel Email |
| Email Whisperer Specialist (EWS) ID # | | Stop Email Send to Management |
| | | Stop Customer |
| | | Stop EWS |
| | | Spell check |
| | | Grammar check |
| | | Certification Stamp |
| | | List active EWS ID #s |
| Email Whisperer Manager (EWM) ID # | | List Active Cust ID #s |
| | | # Emails per hour |
| | | # Emails per day |
| | | # Emails per week |
| | | # Revisions per hour |
| | | # Revisions per day |
| | | # Revisions per week |
| | | # of Non Deliveries per day |

FIG. 11

Video Turorial 1 of 3

Email Type Selection

Sample Text Here Sample Text Here Sample Text Here

| Select your category ▼ |
| Business |
| Personal |

Sample Text Here Sample Text Here Sample Text Here

Description

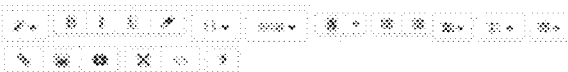

Sample Text Here Sample Text Here

P                                                                Words: 10

Upload Audio File [          ]  Upload

○ Please connect me to a live Email Whisperer Speciailst
○ Please process my email as soon as you can send back to me via email PRICEING ❓   Sample Text Here

| Live Session | Waiting Bin Session |
|---|---|
| $2 for first 2 mins Afterward $1.75/min | $10/request |

Select Certifications: ○ Base Level ● Second Level ○ CEO Level ○ None

Your First email! Welcome.                    NEXT: PAYMENT

FIG. 14

  Video Turorial 1 of 3

Email Type Selection

Sample Text Here Sample Text Here Sample Text Here

Business ▼

| Business | Emotion | |
|---|---|---|
| Law ○ | Happy | 0 ▼ |
| Finance/Banking ◉ | Angry | 0123456789 10 |
| Retail ○ | Sad | |
| Real Estate ○ | Excited | |
| Construction ○ | Afraid | |
| Agriculture/Farm ○ | Concern | |
| Restaurant ○ | Important | 0 ▼ |
| | Difficulty | 0 ▼ |
| | Detail | 0 ▼ |
| | Vocabulary | 0 ▼ |

Sample Text Here Sample Text Here Sample Text Here

Description

Sample Text Here Sample Text Here

P                                                                 Words: 10

Upload Audio File [        ]  [Upload]

◉ Please connect me to a live Email Whisperer Speciailst
○ Please process my email as soon as you can send back to me via email PRICEING ❓  Sample Text Here

| | Live Session | Waiting Bin Session |
|---|---|---|
| | $2 for first 2 mins Afterward $1.75/min | $10/request |

Select Certifications: ○ Base Level ● Second Level ○ CEO Level ○ None

Your First email! Welcome.                    [NEXT: PAYMENT]

FIG. 15

2 of 3
Payment Method
Sample Text Here Sample Text Here Sample Text Here
⦿ Credit Card ○ Paypal ○ Apple Pay
Cardholder Name *
Credit Card Number *
Numbers only, no spaces or dashes
Expiration Date *
CVV *   What's This?
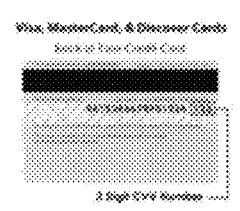
☑ I accept the terms and conditions of the website and the liability waiver.
<<BACK
NEXT: PAYMENT
FIG. 17

FIG. 19

- Dashboard
- Notifications
- Content Management
- Email Whisperer Specialists
- User Management
- Contact Forms
- Settings Admin ▼

EMAIL WHISPERER SPECIALISTS
Waiting Bin

| | |
|---|---|
| Date: | 07-25-2017 |
| Client ID: | #55475 |
| Email Category: | Business |
| Email Type: | Finance/Banking |
| Email Emotions: | Happy(6/10) |
| Certifications: | Basic Level |
| Client Description: | Sample Text Here |

Audio Notes:
EWS Description:

Sample Text Here

Submit

Action
Email to Client
Submit to Management
Flag Email
Certification Stamp

SYSTEMS AND METHODS FOR PROVIDING WRITING ASSISTANCE

BACKGROUND

Field

This disclosure relates generally to writing assistance, and, more particularly, to systems and methods for providing remote writing assistance to a user writing communications, such as electronic communications.

Related Art

Electronic communications, in particular emails and text messages, are susceptible to miscommunication. The meaning and intent of electronic communications are often miscommunicated or even lost because of the sender's inexperience or lack of skill n wilting clear and concise communications in a particular context. For example, a sender with a limited grasp of a particular language may draft an electronic communication having poor syntax or grammar. In some cases, the sender may have difficulty properly conveying sensitive or personal information.

SUMMARY

The systems and methods of this disclosure provide on-demand electronic communication writing assistance services. The systems and methods of this disclosure addresses the challenges associates with drafting electronic communications, such as emails, by providing live expert help with grammar, sentence structure, organization, tone, etc., and at the same time be anonymous when necessary. In embodiments, the systems and methods include providing a certification confirming the level of quality or other characteristic of the electronic communication that has been subjected to the writing assistance services.

This summary is not intended to identify key features or essential features of the claimed subject matter, nor is it intended to be used as an aid in isolation to determine the scope of the claimed subject matter.

According to one embodiment, a system for providing assistance with electronic communications includes a network device configured to communicate with a client computing device, a processor, and a memory including instructions stored thereon. When the instructions are executed by the processors, the instructions cause the system to receive category information and tonal information of an electronic message and a certification level selected from a plurality of certification levels, from the client computing device via the network device, create a project for the electronic message, select an assistant from a plurality of assistants for the project based on the category information and the tonal information, and provide a message, which has been edited by the selected assistant based on the category information and the tonal information, to the client computing device.

In an aspect, the instructions, when executed by the processor, further cause the system to select a reviewer from a plurality of reviewers for the project based on the selected certification level when the selected certification level is higher than a predetermined certification level. Before the message is provided, the message has been reviewed by the selected reviewer based on the selected certification level when the selected certification level is higher than the predetermined certification level.

In another aspect, the instructions, when executed by the processor, further cause the system to provide a certification confirming the selected certification level within the provided message.

In another aspect, the system further includes an administrator computing device configured to review the edited message. The edited message is provided to the client computing device after the administrator computing device approves the edited message.

In another aspect, the administrator computing device is further configured to revise the edited message. The revised message is provided to the client computing device.

In yet another aspect, the category information includes at least one of business and personal.

In yet another aspect, the tonal information includes at least one of emotion, importance, vocabulary, and difficulty.

In yet another aspect, the tonal information is a range of values.

In still yet another aspect, the instructions, when executed by the processor, further cause the system to receive a payment for the project from the client computing device.

In another embodiment, a method for providing assistance with electronic communications includes receiving category information and tonal information of an electronic message and a certification level selected from a plurality of certification levels, from the client computing device via the network device, creating a project for the electronic message, selecting an assistant from a plurality of assistants for the project based on the category information and the tonal information, and providing a message, which has been edited by the selected assistant based on the category information and the tonal information, to the client computing device.

In an aspect, the method further includes selecting a reviewer from a plurality of reviewers for the project based on the selected certification level when the selected certification level is higher than a predetermined certification level. Before the message is provided, the message has been reviewed by the selected reviewer based on the selected certification level when the selected certification level is higher than the predetermined certification level.

In another aspect, the method further includes providing a certification confirming the selected certification level within the provided message.

In an aspect, the method further includes reviewing the edited message by an administrator computing device. The edited message is provided to the client computing device after the edited message is approved by the administrator computing device.

In another aspect, the method further includes revising the edited message by the administrator computing device. The revised message is provided to the client computing device.

In yet another aspect, the category information includes at least one of business and personal.

In yet another aspect, the tonal information includes at least one of emotion, importance, vocabulary, and difficulty.

In yet another aspect, the tonal information is a range of values.

In still yet another aspect, the method further includes receiving a payment for the project from the client computing device.

In yet another embodiment, a nontransitory computer readable storage medium including instructions stored thereon that, when executed by a computer, cause the computer to perform a method for providing assistance with electronic communications. The method includes receiving category information and tonal information of an electronic message and a certification level selected from a plurality of certification levels, from the client computing device via the network device, creating a project for the electronic message, selecting an assistant from a plurality of assistants for the project based on the category information and the tonal information, and providing a message, which has been edited by the selected assistant based on the category information and the tonal information, to the client computing device.

Any of the above aspects and embodiments of the present disclosure may be combined without departing from the scope of the present disclosure.

BRIEF DESCRIPTION OF THE DRAWINGS

FIG. 7 is an introduction screen interface according to an embodiment of this disclosure;

FIG. 8 is a communication selection screen interface according to an embodiment of this disclosure;

FIG. 9 is a customer interface according to an embodiment of this disclosure;

FIGS. 10 and 11 are agent dialogue box interfaces according to embodiments of this disclosure;

FIGS. 14-44 are interface screens according to yet other embodiments of this disclosure.

DETAILED DESCRIPTION

The systems and methods of this disclosure give the user the ability to have a professional or professional editorial team edit or create an electronic communication based on content provided by a user. The experienced, professional editorial team can strategically think about how to prepare the best, most professional communication using the content provided by the user. While other solutions automatically assemble or correct content via automated correcting software, the systems and methods of this disclosure offer editing and drafting assistance by an experienced professional, who can enhance and optimize the content of the electronic communication to meet the user's desired characteristics, e.g., tone. For example, the experienced professional may optimize the language, to include appropriate transitions, and to include meaningful and well-structured language in a way that conforms to a user's original outline or initial draft to result in a an appropriate electronic communication for a given situation or context.

Since an electronic communication is a reflection of the user's personal image, the quality of that electronic communication may be an important factor. In some cases, a poorly written or amateurish electronic communication would reflect poorly on the user's personal image. Thus, to ensure a high level of quality, some embodiments of the systems and methods of this disclosure give a user access on-demand, professional communication drafting support services. In embodiments, the systems and methods facilitate the provision of these support services at an affordable price point.

Embodiments of this invention will be better understood from the detailed description provided below and from the accompanying drawings of various embodiments of this disclosure. In general, embodiments of this disclosure are directed towards providing writing assistance to a user based on an applicable context and/or tone when composing a communication, such as an email. The user is able to select the context, tone, and/or other parameters, and receive feedback in such way that a specialist or an agent assisting the user can assign a value (selected from a predetermined scale of values) to the context and/or tone or the user can select an initial context and/or tone value via a computer interface. The computer interface and the context and/or tone possibilities are described below.

Figure 1:
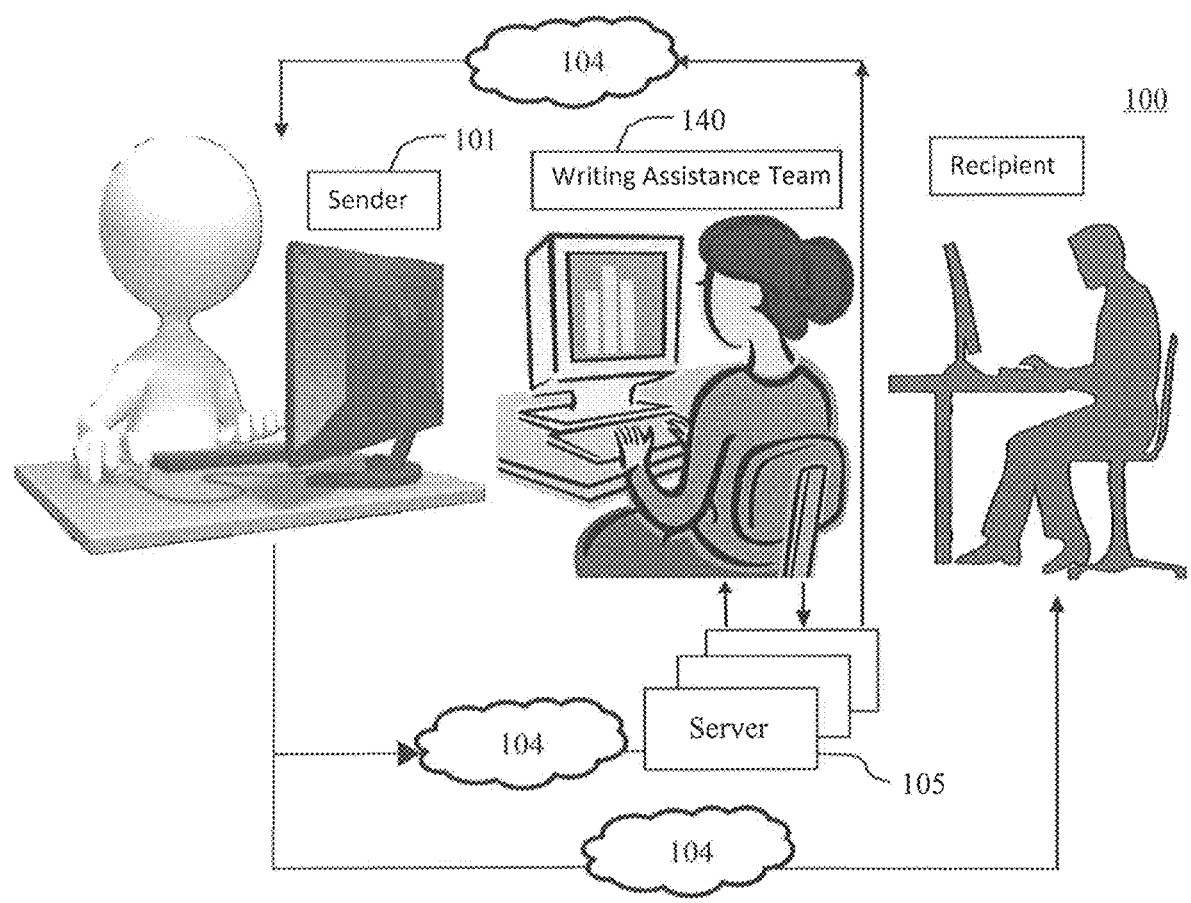
FIG. 1 shows an overall architecture of the systems and methods for writing assistance based on content, context, and/or tone including feedback from a professional or skilled writer is provided.
Figure 2:
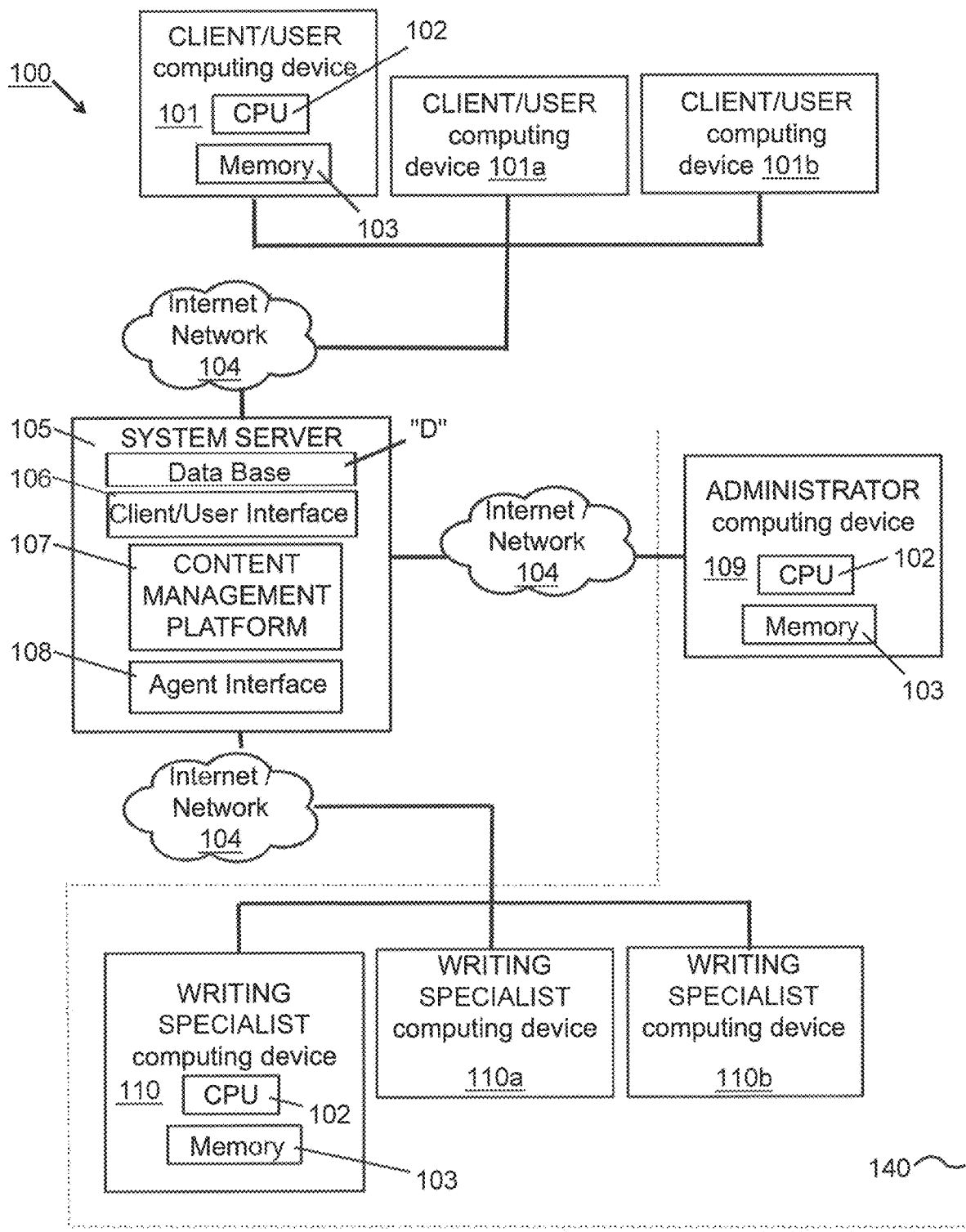
FIGS. 2 and 3 are diagrams illustrating systems in accordance with embodiments of this disclosure.
Figure 3:
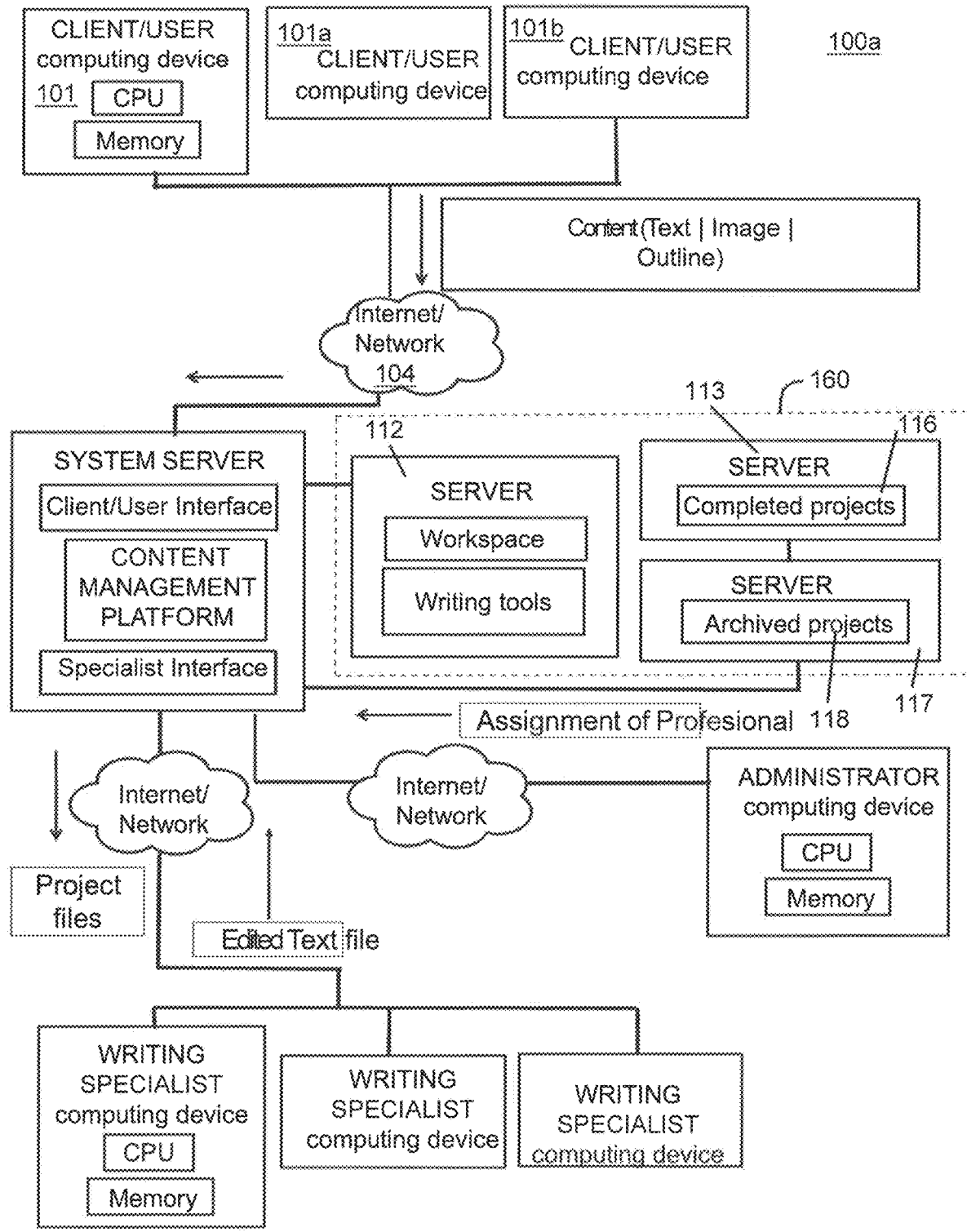

FIG. 1 shows an overall architecture of the systems and methods for writing assistance based on content, context, and/or tone including feedback from a professional or skilled writer is provided. As shown in FIG. 1, the writing assistance system 100 and method enables a user with a computing device 101 to initiate a content management session to request writing assistance while the user writes a communication, such as an email, or after the users writes the communication. A user may access the writing assistance system 100, by, for example, accessing a system server 105 over the Internet/network 102 and request editing assistance from a writing assistance team 140 based on a prior selection of parameters or characteristics, for example, context and/or tone FIGS. 2 and 3 are diagrams illustrating systems in accordance with embodiments of this disclosure. As shown in FIG. 2, a diagram illustrating system 100 is depicted including the user computing device 101 (e.g., PC, mobile phone, table, or the like), the system server 105, the writing assistance team 140, and an Internet/network 104. The user with a computing device 101 may access the system server 105 via the Internet/network 104. In embodiments, server 105 can be access by additional computing devices similar to computing device 101. Examples of these additional computing devices are computing devices 101a and 101b. The computer device 101 may include a central processing unit (CPU) 102 and a computer-readable medium or memory 103.

The memory 103 stores instructions, which, when executed by the CPU 102, causes a user computing device 101 to connect to and communicate with the system server 105 in order to display data on a display connected to the user computing device 101 and to receive data input by a user via an input/output device connected to or incorporated into the user computing device 101. In embodiments, the memory 103 includes volatile media, nonvolatile media, or both. In embodiments, the memory 103 includes removable media, non-removable media, or both. The writing assistance system 100 may also include a database "D", which, for example, stores information regarding users (e.g., user preferences and user history) and writing specialists or agents. The writing assistance system 101 may also utilize various network devices.

Other examples of information that may be stored in the memory 103 include computer-useable instructions, data structures, program modules, and other data representations. Examples of the memory 103 include random-access memory (RAM), read-only memory (ROM), electrically erasable programmable read-only memory (EEPROM), flash memory, CD-ROM, digital versatile discs ("DVD"), holographic media, optical disc storage, magnetic cassettes, magnetic tape, and magnetic disk storage. These technologies can store information temporarily, momentarily, or permanently.

After the user computing device 101 accesses the system server 105, the user is provided with a user interface 106, which may request input from the user. User interface 106 can be a series of screens through which the user supplies content, which is used by a revision team or specialist to revised or create an electronic communication. The content supplied by the user can include images, video, text, audio, or any combination of these content items. The user may have this content stored in a variety of formats on the user computing device 101. The user interface 106 may also include one or more screens that allow the user to select a plurality of files including content or one or more electronic communications to be edited and/or content that may be used as an outline or starting point to create an electronic communication. In addition, one or more screens of the user interface 106 may allow the user to select and/or input parameters and/or instructions for the writing assistance team 140.

Once the user submits the content and/or one or more electronic communications and associated parameters and/or instructions to the system server 105 via the user interface 106, the writing assistance team 140 can access the content and/or one or more electronic communications and the parameters and/or instructions. In some embodiments, the writing assistance team 140 includes at least one manager or administrator and one or more writing assistance specialists, each having a computing device. Using the administrator computing device 109, the manager specialist can access the content management platform 107 via the Internet/network 104 to view and manage the information submitted by the user. The administrator can also use the content management platform 107 to view, select, and assign one or more writing assistance specialists or editors to each project submitted by a user. After a writing assistance specialist is assigned, the assigned writing assistance specialist can access the system server 105 and the information submitted for creation or modification using a specialist interface 108 via the Internet/network 104. The writing specialist can then download all information including the selected parameters to the specialist computing device 110 or can work directly at the server 105 via a client application.

Members of the writing assistance team 140 can be located at any geographic location. Once an electronic communication is edited or created, the writing assistance specialist sends the electronic communication to the administrator via the project management platform 107 for review and feedback. In embodiments where the writing assistance session is a live session, the administrator may or may not be active on the live session or the administrator may be the writing assistance specialist. Once the electronic communication is approved by the administrator, it can be sent by the content management platform 107 to the appropriate user computing device 101 or to a selected recipient.

FIG. 3 is a diagram illustrating a writing assistance system 100a similar to system 100. Writing assistance system 100a includes the computing device 101, the system server 105, the writing assistance team 140, the Internet/network 104, and a server array 160. Server array 160 may include a single server or a plurality of servers. For example, server array 160 may include a second server 112 including a memory 103 for storing a workspace 113 for communication content that has been initiated by the user but has not yet been submitted to a writing specialist. The memory of the second server 112 may further store communication content 114 for a project that has been submitted. In embodiments, a third server 115 may store projects that are completed 116 and a fourth server 117 may store projects 118 for a selected period of time.

Figure 4:
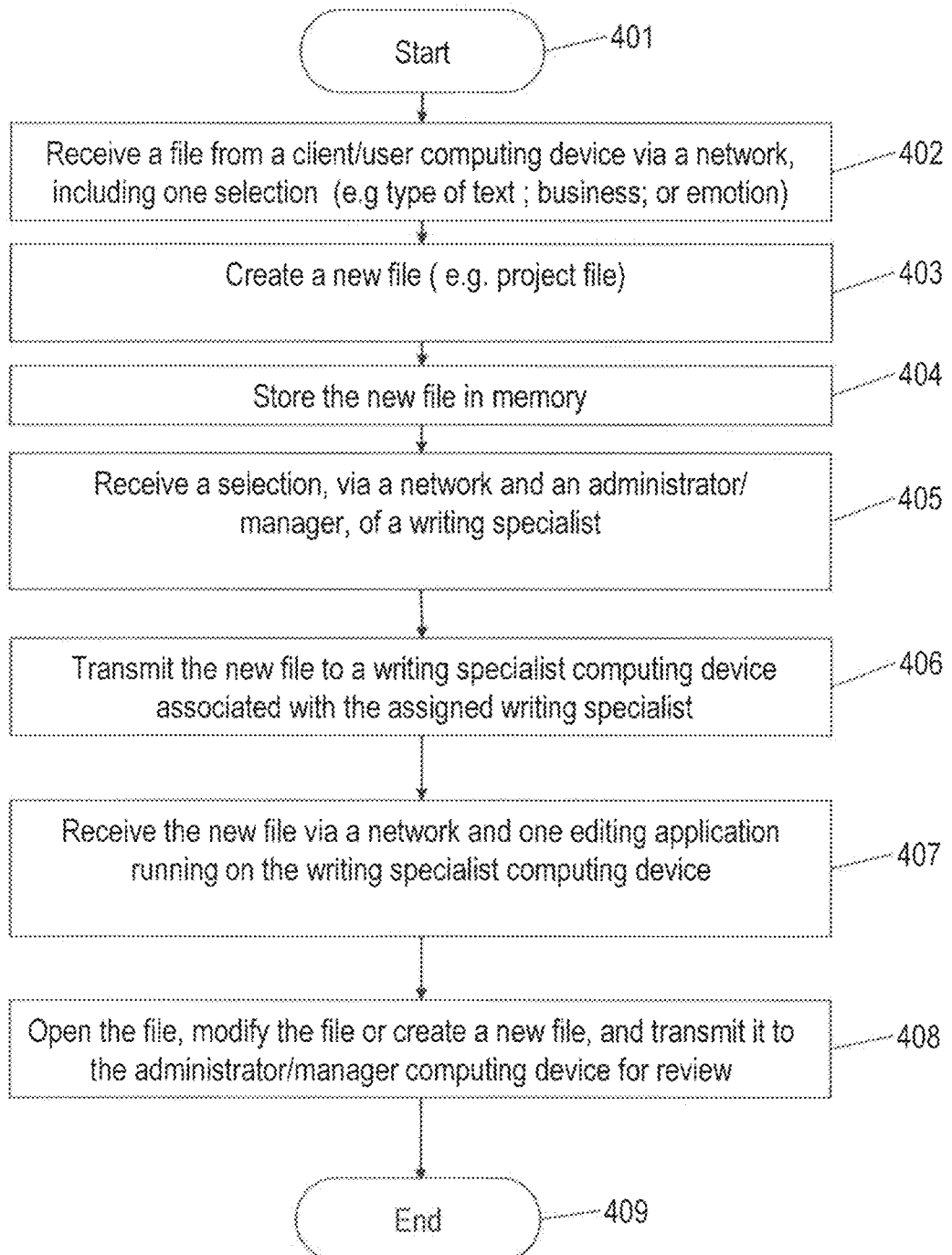
FIGS. 4-6 are flow diagrams illustrating examples of processes according to embodiments of this disclosure.
Figure 5:
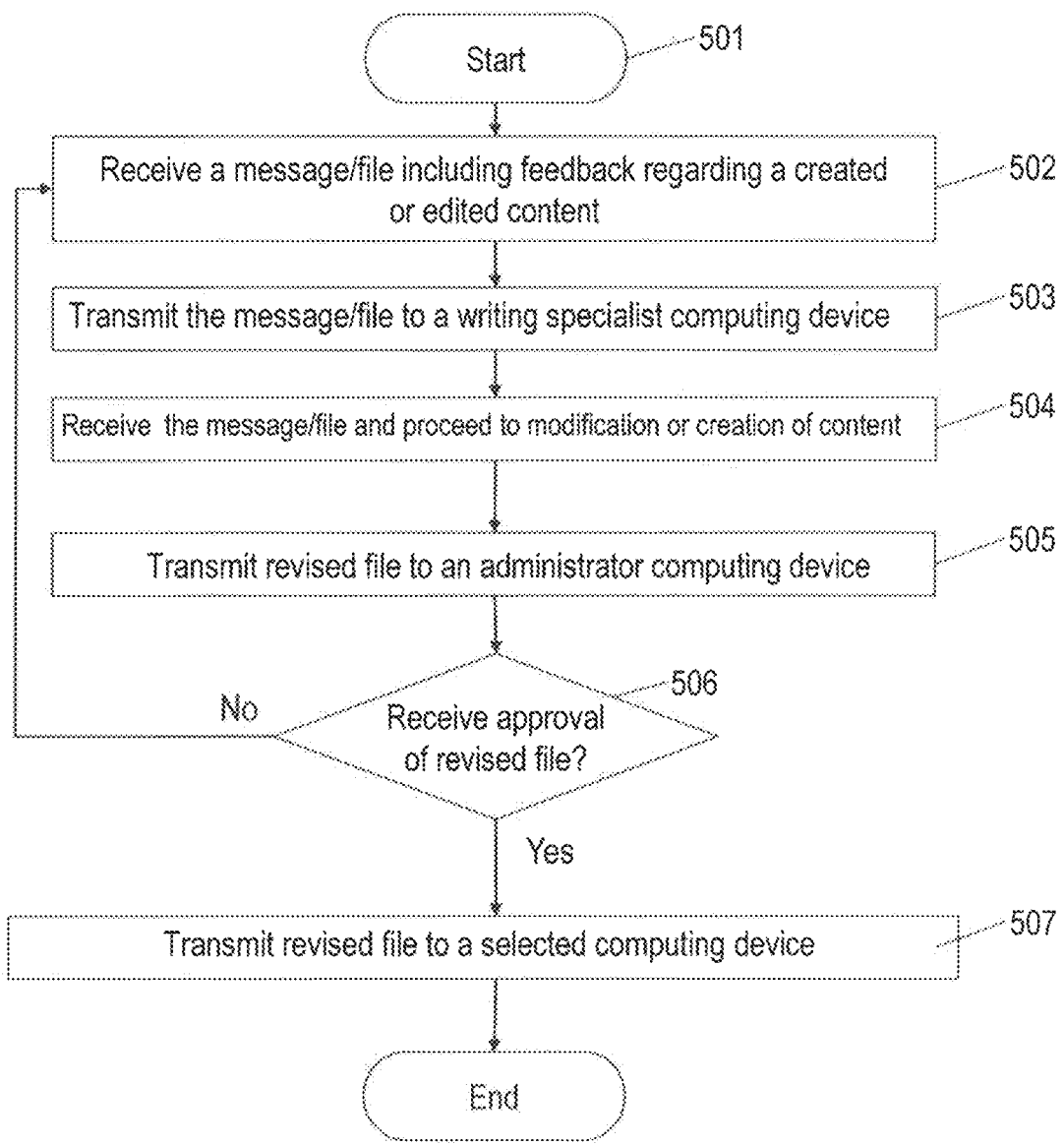

FIGS. 4 and 5 are flow charts illustrating examples of processes according to embodiments of this disclosure. As shown in FIG. 4, after starting at block 401, a server receives at least a portion of communication content (e.g., text, a picture, or an audio file) and at least one feature or parameter provided to the writing assistance system (e.g., an emotion associated with the communication, a tone of the communication, or the type of content to be created) via a network at block 402. At block 403, the server creates a project or job and assigns it a tag or an identification label. At block 404, the project is stored in memory. At block 405, the server receives a selection by an administrator of a writing specialist to be assigned to the project from the administrator computing device. At block 406, the server transmits the project to a writing specialist computing device associated with the assigned writing specialist. At block 407, the server receives communication content edited or created by the writing specialist using at least one editing application running on the writing specialist computing device based on the at least one portion of the content provided by the user. Before ending at block 408, the server transmits the created or edited communication content to a selected computing device for review.

Figure 6:
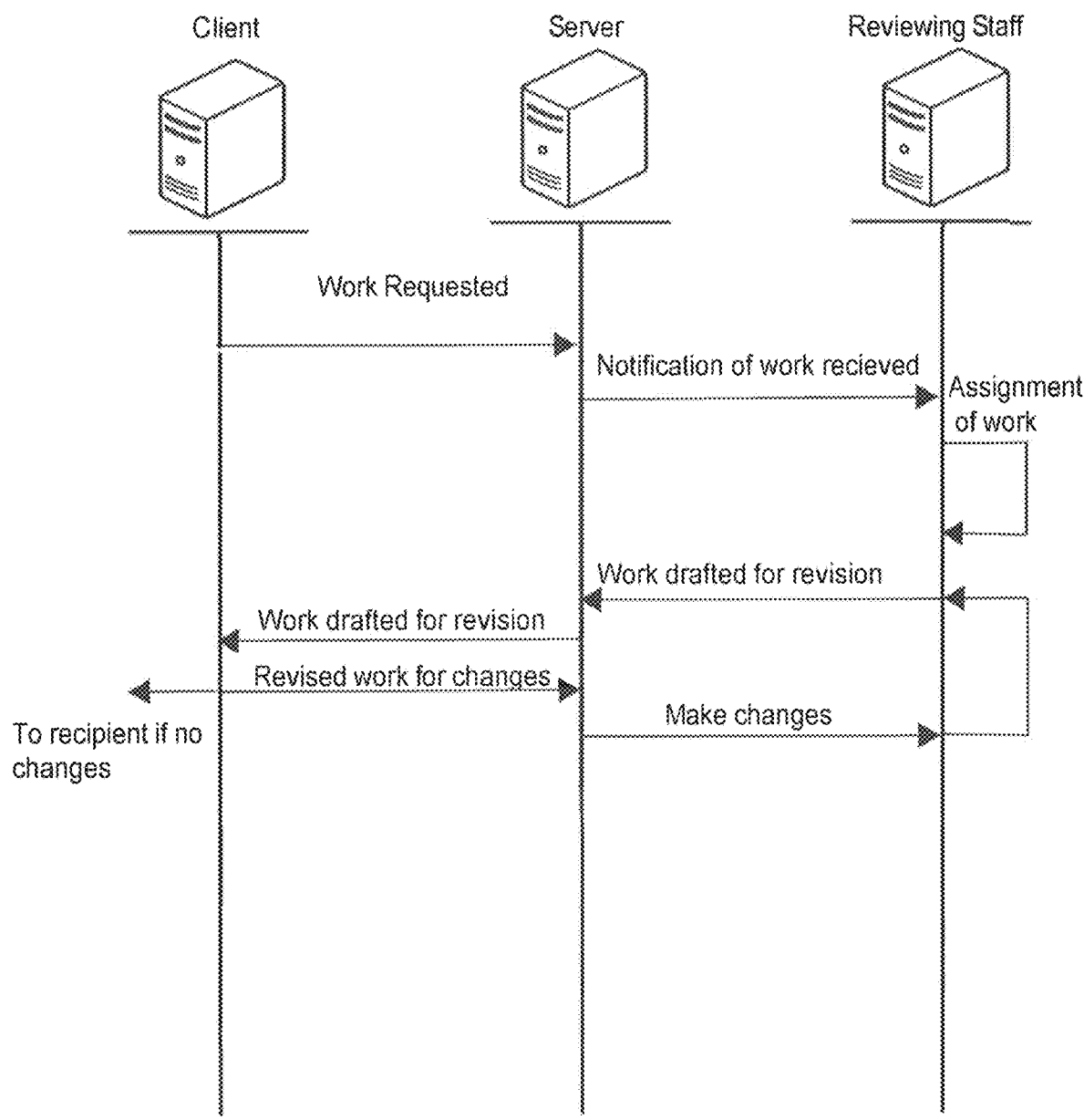
Figure 12:
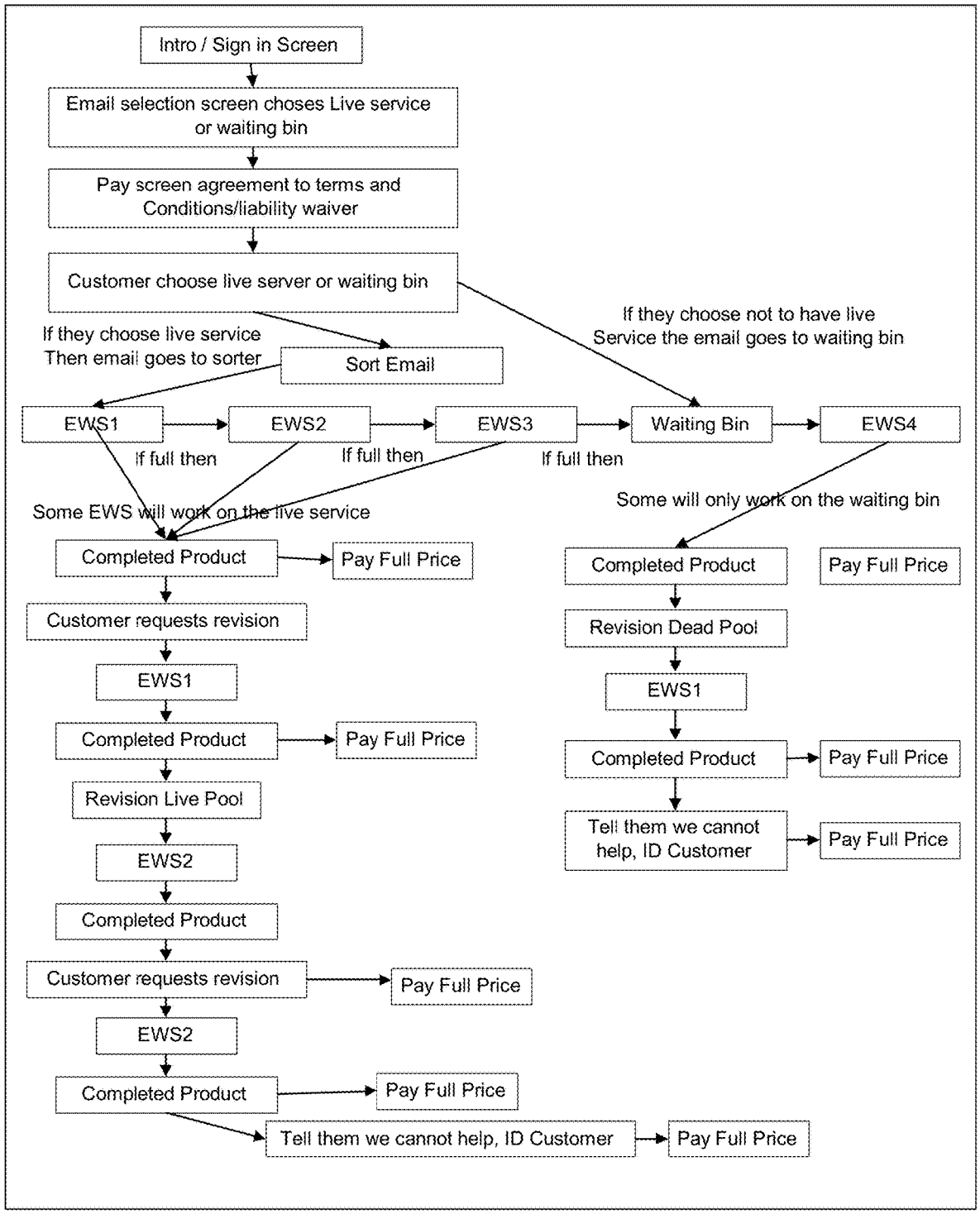
FIGS. 12 and 13 are flow diagrams according to other embodiments of this disclosure.
Figure 13:
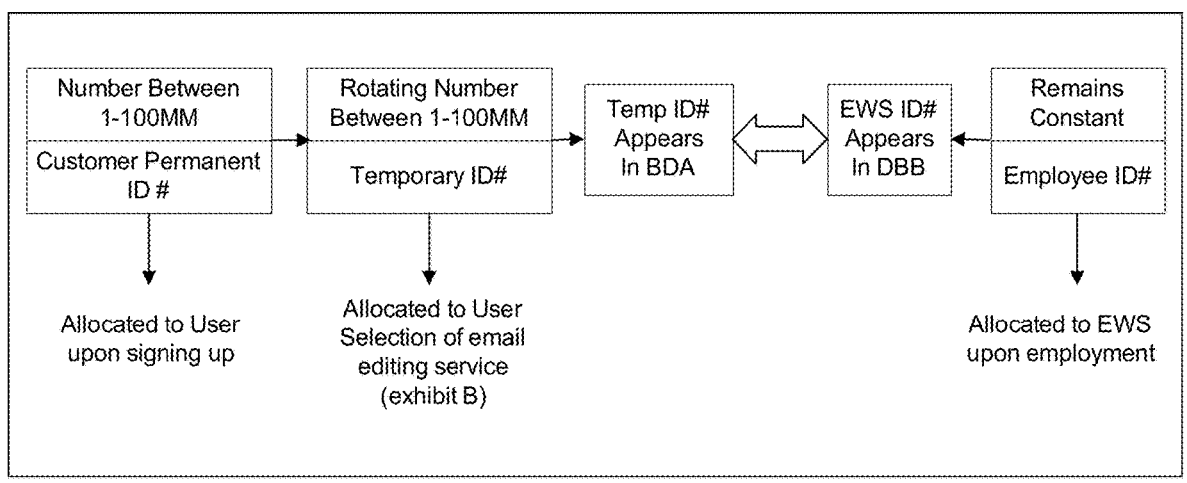

FIG. 5 is a flow chart illustrating an example process in which a writing specialist receives feedback from an administrator. As shown in FIG. 5, after starting at block 501, the server receives a message including edited or created content (e.g., edited email or essay) and feedback about the content via a selected network, at block 502. At block 503, the server transmits the message to a writing professional's computing device via a selected network. At block 504, a writing professional receives the message and proceeds to make revisions to the edited content based on the feedback included in the message. At block 505, the revised content is transmitted to the administrator's computing device so that the administrator can inspect the revised content. At block 506 the administrator approves and/or sends the revised content back to the writing professional at block 505 for further revisions. If the content is approved by the administrator, the content is transmitted to a selected recipient at block 507. FIG. 6 is another example of a process in which a writing specialist receives feedback from an administrator.

FIGS. 14-44 detail examples of user interfaces for embodiments of the writing assistance system (Appendix A shows examples of user interfaces for some mobile embodiments of the writing assistance system). For example, if the user believes that the tone, or another parameter, used to compose the communication is not a tone in accordance to the user's intended tone, or other parameter, the user can select a higher or lower value for the tone within the values of a predetermined scale and request further assistance with editing of the communication from the writing agent or specialist. In other embodiments, the writing assistance system includes an interface through which the user can select parameter values including a scale of values associated with different levels of tones and at least another parameter including the context, environment, situation, topic, or state of mind. For example, the user can select a situation (e.g., business, law, finance, real estate, school, and the like); a context (e.g., medical, sports, entertainment, romance, car, personal, and the like); a state of mind (e.g., happy, angry, excited, afraid, confrontational, and the like);

a tone (e.g., aggressive, forgiving, demanding, indifferent, gentle, friendly, and the like); give a tone value based on a range or a scale (e.g., a scale from 1-10); or any combination of these parameters.

After the user selects the value for the tone, at least one interface screen for writing a communication, e.g., an email, is presented by the writing assistance system to the user. The interface screen enables communication between the writing agent or expert and the user. The communication between the writing agent and the user can be a live communication and may include at least one communication element like a chat text box, video chat, or audio chat, or the communication can be a delayed communication enabling the user to send the communication, e.g., the email, for later revision.

As mentioned above, the writing assistance system enables support, mentoring, and assistance when writing a communication in such a way that a writing agent can assist a user with the creation or revision of a message or email communication that meets desired parameters, e.g., portrays a desired level of professionalism and avoids unnecessary language. The writing assistance system and method can be implemented with computer-executable instructions stored on computer-readable media and retrieved and executed by a computer. The computer-executable instructions include processes for supporting a user when writing a communication, such as an email. In embodiments, the user may request the writing assistance system to partially or fully write the email. Specifically, the writing assistance system may outline the message of the communication or prepare a draft of a communication based on the above-mentioned parameters including context and/or tone as per the user's request. It is understood that the writing assistance system can assign a customer or personal number at any point during a communication writing assistance session, such as an ID number, a label, a bar code, or any other type of identifier. The system may include a remote storage device, which can act as a drop box where a writing agent can access a previously deposited communication, e.g., an email, for editing. The user may have the desire for a feature that allows the user to be anonymous to the writing assistance system. Thus, it is understood that the writing assistance system can include a live in-person review of the draft communication in a private, anonymous, and secure format.

In embodiments, delayed review of a draft communication may be a selection included in the writing assistance system. A reviewed and edited message can be delivered to a user's inbox within the writing assistance system or the user's email address. When delayed review is selected, the writing assistance system, via the communication support team (e.g., agents, support managers, administrative members and the like), can suggest alternative wording and phrasing and add salutations and closing words, resulting in clearer and thoughtful communications. Further, the writing assistance system can provide the user with a certification service that gives both the sender and receiver the assurance that the communication has a particular level of quality or is drafted to meet certain writing requirements. Certification can come from the writing assistance system or a third-party certification system.

Figure 16:
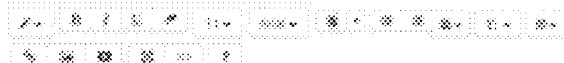
Figure 18:
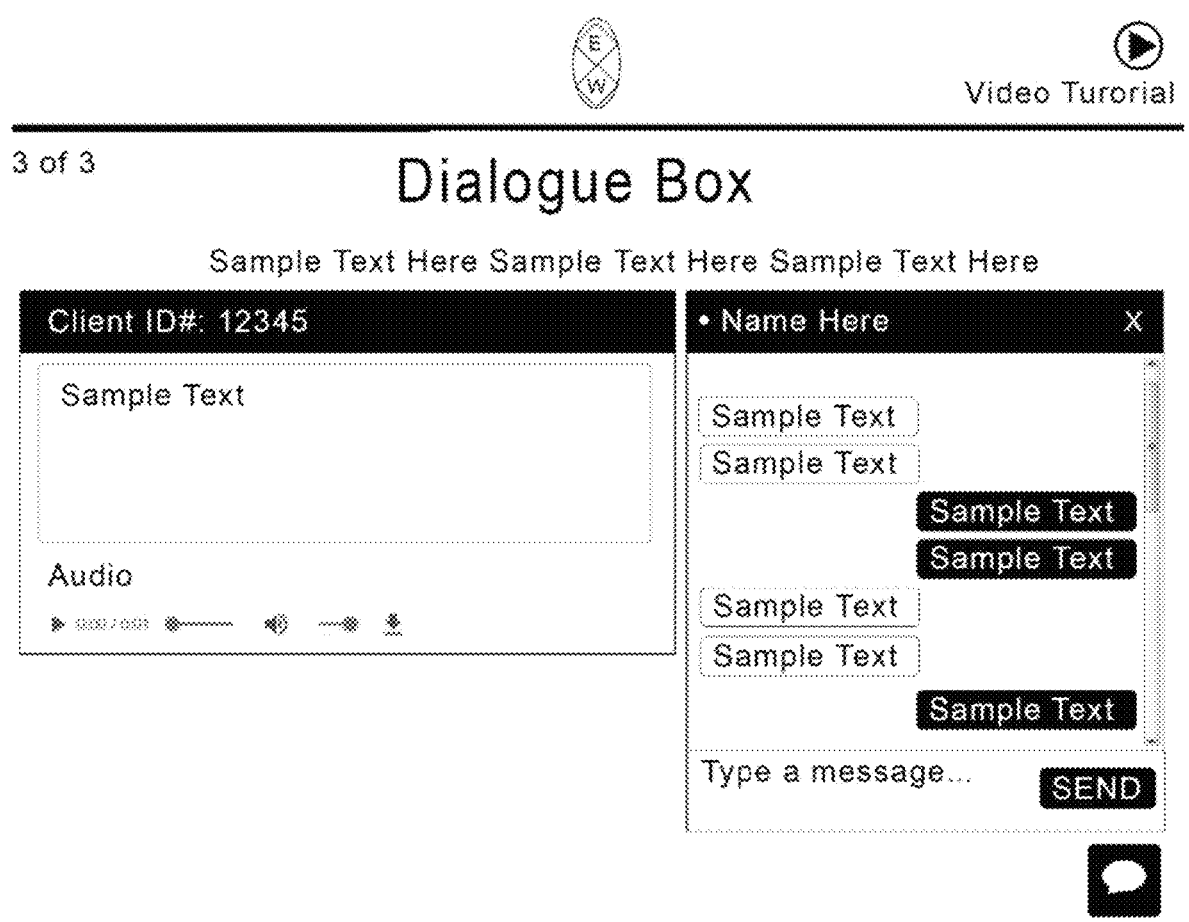
Figure 20:
Figures 22, 23:
Figure 32:
Figure 33:
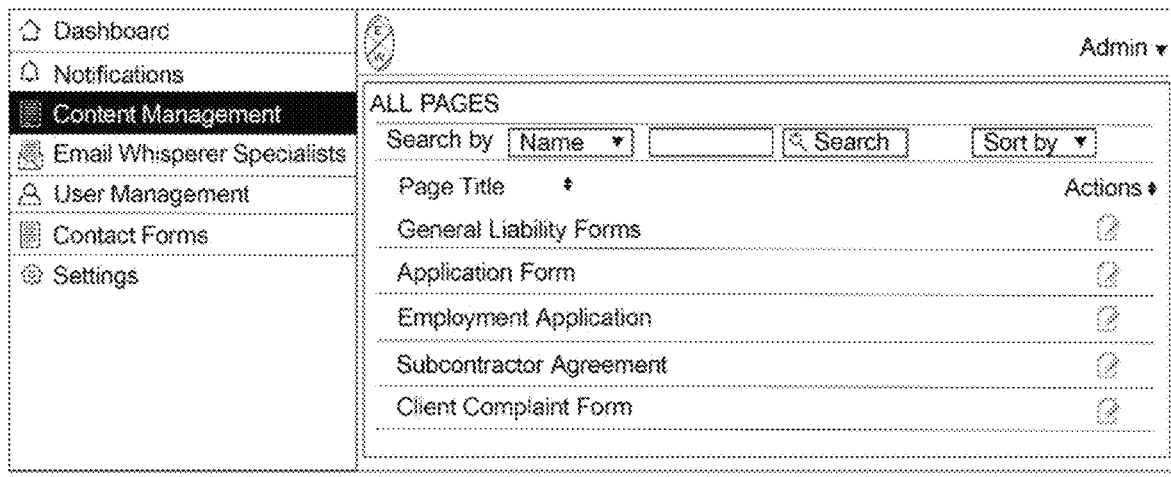

For example, FIGS. 14-16 show customer interfaces, which request the customer to select a level of certification. Further, the customer may request a certification be fixed to the electronic work product that provides proof that the work product has been edited. The certification may provide a standard of excellence associated with the level of work product.

In embodiments, the customer interfaces may show "Base Level," "Second Level," "CEO Level," and "None." The "Base Level" may indicate that the message is edited by a first level writing assistant. The "Second Level" may indicate that the message is edited by a writing specialist, who has been selected from a group of writing specialists selected by the writing assistance system or the third-party certification system. The "Second Level" may further indicate that the electronic message may be reviewed by the writing specialist after the writing assistant edited the message. The "CEO Level" may indicate that the message is further reviewed by a manager or a writing expert whose level is higher than that of the writing specialist who has reviewed the message. The manager may further review the electronic message to confirm that the customer's needs are met and the message has a quality appropriate for personal or business purposes. In this way, the customer can select a certification level which meets the customer's needs.

The interface "None" may indicate that the message may be reviewed by only a program or a computer. Further, the interface "None" may not require a certification icon or statement to be included in the message.

The writing assistant system may attach or include a corresponding certification icon or statement in the message so that the customer can see how much scrutiny has been given to the review process. The certification icon or statement may be inserted into the end of the electronic message when the electronic message is delivered to the customer's email inbox.

In embodiments, the writing assistance interfaces may include multiple layers or pages including any combination of the following: a front page; an introduction page; a sign in page; a sign up page; a payment information screen, an agreement to terms of use; a liability waiver; types of email selected (including sensitivity, importance, detail selector, etc.); a dialogue screen; retrieval of ID password or username; links to articles; an explanation of terms; a survey screen; an about us screen; or a contact us screen. Additionally, the user can fill out or download agreements, and download a variety of forms (e.g., general liability; application form; employment application; subcontractor agreement; privacy notice; and the like).

The user may sign up with the writing assistance service via the website through a "sign on" screen, where the user can fill in personal information, such as name, phone number, email address, physical address, payment information (credit card number, expiration date, CVV code), or any combination of this personal information. On the "sign on" screen, the user may agree to the terms of payment, which may include a base rate and price per minute thereafter. Once the user submits the information on the "sign on" screen, she is assigned a permanent ID number that may be presented on all pages of the writing assistance website as the user navigates through the pages of the writing assistance website. It is understood that the user may opt out of the option of showing her ID number or may opt to use another identifier.

In embodiments, after a user has navigated through the user interface that allows for selection of types of communication, the user may have the option to choose the type of business to which the communication relates (e.g., law, finance/banking, retail, real estate, construction, agriculture/farming, restaurant, or the like) or the type of personal communication (e.g., medical, sports, entertainment, romance, marriage, divorce, personal finance, home, car, or the like). Then, the user has the option to select the emotion or tone and the level of the emotion or tone of the communication by assigning a number from 1 to 10 to one or more of the following emotions or tones selected by the user: happy, sad, angry, excited, urgent, concern, important, difficulty, detail vocabulary.

Next, the user has the option to work with a live agent or to leave the email in a virtual bin to be edited by a writing agent at a later time. Once the options are selected, the user may get assigned a temporary identifier such as a temporary ID number that remains with the user only for the session and is linked to the above-mentioned permanent identifier number via a date and time stamp, which may be treated as confidential information, which may be accessible by only management. In embodiments, the temporary ID number rotates once an hour or any appropriate period so the permanent number and temporary number only match up once per year of use. Further, the identity of the writing agent and the writing assistance staff may not be available to the user and vice versa.

In another example, the writing assistance system includes a timer showing the wait time for an available live editor. When a live editor become available, the main action screen that includes of two dialogue boxes is displayed. A first dialogue box ("DBA") is the user's box through which the user communicates the communication editing request. The user may be able to type directly into the box, copy and paste to the box, or leave a verbal message, and may be able to select a salutation for the communication. The clock that calculates the cost of the session begins once the user enters information into the DBA.

In embodiments, during a communication writing assistance session, the user may be presented with at least one of the following selections: apply certification; accept email and purchase; cancel email and purchase; please revise further; or submit to bin for delayed editing. The writing assistance system staff reads the email editing request in the DBA and delivers the finished product into a second dialogue box (DBB). For on-demand sessions, the writing agent and the user are able to see the email editing request and work progress in real time. When depositing a communication for revision, the writing agent may only see the email editing request in the DBA. Further, a stamp of certification can be requested by the user. The stamp includes a time and date stamp.

In embodiments, during a live session, the user may have the option of receiving one round of revisions from a writing agent. In some cases, a second round of revisions can be requested. If the user is not satisfied with the second round of revisions, the user may request a second writing agent or a new writing agent to look at the communication for further revisions or the option of pay and exit the site will also be available. If a new writing agent is requested, and extra round of revisions are granted to the user. After the second round of revisions, if the user is still not satisfied with the communication, a message is displayed informing the user that the latest draft of the communication has been sent to management for further revisions.

In embodiments, a communication needing revisions is picked up by a writing agent from the drop box for editing (or "bid editing session") and goes through a revision process including multiple steps. For live editing sessions, the user can either copy the finished product from the DBB or have the finished product emailed to them directly. During a bin editing session, the user may only receive the finished product via email. Once the session has ended and the user has paid for the finished product, the temporary ID number returns to a pool. In some embodiments, no user receives the same temporary ID number in the same year.

With respect to the certification feature of this disclosure, a certification stamp confirms that the communication (e.g., an email) was edited and reviewed by one or more writing experts, and indicates that the information in the communication accurately reflects the intent of the sender. While in use, a communication writing specialist (CWS) dialogue screen may have a Dialogue Box A ("DBA"), a Dialogue Box B ("DBB"), and an additional Dialogue Box C ("DBC"). The DBC is used by the communication writing manager (CWM) to assist and substitute for the DBB when necessary. The CWS and CWM may interface through the DBC. The CWS screen may include the elements from the user screen and any combination of the following additional buttons: submit to user; email to user; submit to second revision; submit to bin/pool; submit to management; cancel email; cancel and submit to management; or certification stamp. The CWM screen may include all the button from the CWS Screen and any combination of the following buttons: submit to user; list active agent identification tags; list active user identification tags; email per hour; emails per day; emails per week; revisions per hour; revisions per day; revisions per week; or number of non-deliveries per day.

In embodiments, the writing assistance system provides assistance to users with editing and drafting of communications via at least one process or et of rules to be followed. For example, multiple algorithms may be used for assignment and time and date stamping of the temporary identifiers (user ID numbers); for the administration of the communication writing service throughout the system; and for the time stamping and subsequent charging of fees. It should be understood that the foregoing description is only illustrative of this disclosure. Various alternatives and modifications can be devised by those skilled in the art without departing from the disclosure. Accordingly, this disclosure is intended to embrace all such alternatives, modifications, and variances. The embodiments described with reference to the attached drawing figures are presented only to demonstrate certain examples of the disclosure. Other elements, steps, methods and techniques that are insubstantially different from those described above and/or in the appended claims are also intended to be within the scope of the disclosure. Appendix B illustrates an outline of a writing assistance system according to some embodiments.

In embodiments, the communication writing assistance system includes a server running a writing assistance server application; a first computing device running a text-input application and a first writing assistance application, the first computing device including a first communications interface configured to transmit text from the text-input application and/or writing parameters from the writing assistance application to the writing assistance server; and a second computing device running a second writing assistance application that receives the text and/or writing parameters and presents them to a writing agent to assist with editing or drafting of a communication, and transmits an edited or drafted communication to the first computing device via the server once the writing agent has edited and/or drafted the communication.

The second computing device includes one or more dictionaries selected by the writing agent, thereby tuning the writing assistance to match a user's communication style. The writing assistance may be provided while the email is being drafted or after the email is stored in data storage of the server.

Some embodiments involve a non-transitory computer-readable medium having computer-executable instructions embodied thereon that, when executed by a computing device, performs a method of providing communication writing assistance based on context and/or tone. The method may include extracting at least a portion of text of a communication drafted by a user from a user interface; determining contextual information of the communication based on the extracted at least a portion of the text, wherein the contextual information includes a specific recipient to which the communication is addressed; determining a communication style of the user to the specific recipient by analyzing text in one or more communications previously sent from the user to the specific recipient and one or more communications previously sent from the specific recipient to the user, wherein, when determining the communication style, more weight is given to the one or more communications previously sent from the user to the specific recipient than is given to the one or more communications previously sent from the specific recipient to the user; determining a language used in the communication; selecting one or more dictionaries from a plurality of dictionaries, wherein the one or more dictionaries are selected in a manner consistent with the communication style; and providing writing assistance that utilizes the selected one or more dictionaries, thereby notifying the user that writing assistance has begun. The writing assistance may be provided while the communication is being drafted.

What is claimed is:

1. A system for providing assistance with electronic communications, the system comprising:
    a network device configured to communicate with a client computing device;
    a processor; and
    a memory including instructions stored thereon that, when executed by the processor, cause the system to:
        receive category information and tonal information of an electronic message to communicate with a reviewer the nature of subject matter of the electronic message and a certification level selected from at least three certification levels, from the client computing device via the network device;
        create a project for the electronic message;
        select reviewers based on a selected certification level; and
        provide a message, which has been edited or reviewed in accordance with the selected certification level, the category information, and the tonal information, to the client computing device,
    wherein the tonal information is a range of values,
    wherein the at least three certification levels include a first certification level, a second certification level, which is higher than the first certification level, and a third certification level, which is higher than the second certification level, and
    wherein the first certification level is reviewed by a first reviewer, the second certification level is reviewed by the first reviewer and a second reviewer, and the third certification level is reviewed by the first reviewer, the second reviewer, and a third reviewer,
    wherein a certification icon indicating the certification level of the message is inserted into the message.

2. The system according to claim 1, wherein the instructions, when executed by the processor, further cause the system to provide a certification confirming the selected certification level within the provided message.

3. The system according to claim 1, further comprising an administrator computing device configured to review the edited message.

4. The system according to claim 3, wherein the edited message is provided to the client computing device after the administrator computing device approves the edited message.

5. The system according to claim 3, wherein the administrator computing device is further configured to revise the edited message.

6. The system according to claim 5, wherein the revised message is provided to the client computing device.

7. The system according to claim 1, wherein the category information includes at least one of business and personal.

8. The system according to claim 1, wherein the tonal information includes at least one of emotion, importance, vocabulary, and difficulty.

9. The system according to claim 1, wherein the range of values ranges between 1 being the lowest and 10 being the highest.

10. The system according to claim 1, wherein the instructions, when executed by the processor, further cause the system to receive a payment for the project from the client computing device.

11. The system according to claim 1, wherein the instructions, when executed by the processor, further cause the system to provide a certification confirming the selected certification level within the provided message.

12. A method for providing assistance with electronic communications, the method comprising:
    receiving category information and tonal information of an electronic message to communicate with a reviewer the nature of subject matter of the electronic message and a certification level selected from at least three certification levels, from a client computing device via a network device;
    creating a project for the electronic message;
    selecting reviewers for the project based on the selected certification level; and
    providing a message, which has been edited or reviewed based on the selected certification level, the category information, and the tonal information, to the client computing device,
    wherein the tonal information is a range of values,
    wherein the at least three certification levels include a first certification level, a second certification level, which is higher than the first certification level, and a third certification level, which is higher than the second certification level, and
    wherein the first certification level is reviewed by a first reviewer, the second certification level is reviewed by the first reviewer and a second reviewer, and the third certification level is reviewed by the first reviewer, the second reviewer, and a third reviewer,
    wherein a certification icon indicating the certification level of the message is inserted into the message.

13. The method according to claim 12, further comprising reviewing the edited message by an administrator computing device.

14. The method according to claim 13, wherein the edited message is provided to the client computing device after the edited message is approved by the administrator computing device.

15. The method according to claim 13, further comprising revising the edited message by the administrator computing device.

16. The method according to claim 15, wherein the revised message is provided to the client computing device.

17. The method according to claim 12, wherein the category information includes at least one of business and personal.

18. The method according to claim 12, wherein the tonal information includes at least one of emotion, importance, vocabulary, and difficulty.

19. The method according to claim 12, wherein the tonal information is a range of values, which ranges between 1 being the lowest and 10 being the highest.

20. The method according to claim 12, further comprising receiving a payment for the project from the client computing device.

21. A nontransitory computer readable storage medium including instructions stored thereon that, when executed by a computer, cause the computer to perform a method for providing assistance with electronic communications, the method comprising:

receiving category information and tonal information of an electronic message to communicate with a reviewer the nature of subject matter of the electronic message and a certification level selected from at least three certification levels, from a client computing device via a network device;

creating a project for the electronic message;

selecting reviewers for the project based on the selected certification level; and providing a message, which has been edited or reviewed in accordance with the selected certification level, the category information, and the tonal information, to the client computing device, wherein the tonal information is a range of values, wherein the at least three certification levels include a first certification level, a second certification level, which is higher than the first certification level, and a third certification level, which is higher than the second certification level, and wherein the first certification level is reviewed by a first reviewer, the second certification level is reviewed by the first reviewer and a second reviewer, and the third certification level is reviewed by the first reviewer, the second reviewer, and a third reviewer, wherein a certification icon indicating the certification level of the message is inserted into the message.

\* \* \* \* \*